United States Patent [19]

Hirasawa

[11] Patent Number: 4,992,931
[45] Date of Patent: Feb. 12, 1991

[54] DATA ALIGNMENT CORRECTION APPARATUS FOR PROPERLY FORMATTING DATA STRUCTURES FOR DIFFERENT COMPUTER ARCHITECTURES

[75] Inventor: Yutaka Hirasawa, Tokyo, Japan

[73] Assignee: Kabushiki Kaisha Toshiba, Kawasaki, Japan

[21] Appl. No.: 137,674

[22] Filed: Dec. 24, 1987

[30] Foreign Application Priority Data

Dec. 26, 1986 [JP] Japan ............................. 61-315330

[51] Int. Cl.⁵ .......................... G06F 3/00; G06F 9/45
[52] U.S. Cl. .................................. 364/200; 364/280; 364/280.1; 364/280.4
[58] Field of Search ....................... 364/200, 900, 300

[56] References Cited

U.S. PATENT DOCUMENTS

| | | | |
|---|---|---|---|
| 3,916,388 | 10/1975 | Shimp et al. ....................... | 364/200 |
| 3,967,101 | 6/1976 | Fett ..................................... | 364/900 |
| 4,797,810 | 1/1989 | McEntee et al. .................... | 364/200 |
| 4,800,520 | 1/1989 | Iijima ................................. | 364/900 |
| 4,841,435 | 6/1989 | Papenberg ........................ | 364/200 |

Primary Examiner—Thomas C. Lee
Assistant Examiner—Robert B. Harrell
Attorney, Agent, or Firm—Cushman, Darby & Cushman

[57] ABSTRACT

An alignment correction apparatus includes: a first storage section for storing a source data stucture, a second storage section for sequentially storing input block data elements, an alignment data storage section, and a processor. The source data structure includes a plurality of data elements, and each block data element includes at least one data element. Alignment data includes a plurality of alignment data elements independently associated with the block data element. The processor sequentially reads out the alignment data elements from the alignment data storage section, in response to an alignment correction instruction. When the readout alignment data element is predetermined data, a block data element is read out from the first storage section and stored in the second storage section. When the readout alignment data element is not predetermined data, the next alignment data element is read out from the alignment data storage section.

12 Claims, 6 Drawing Sheets

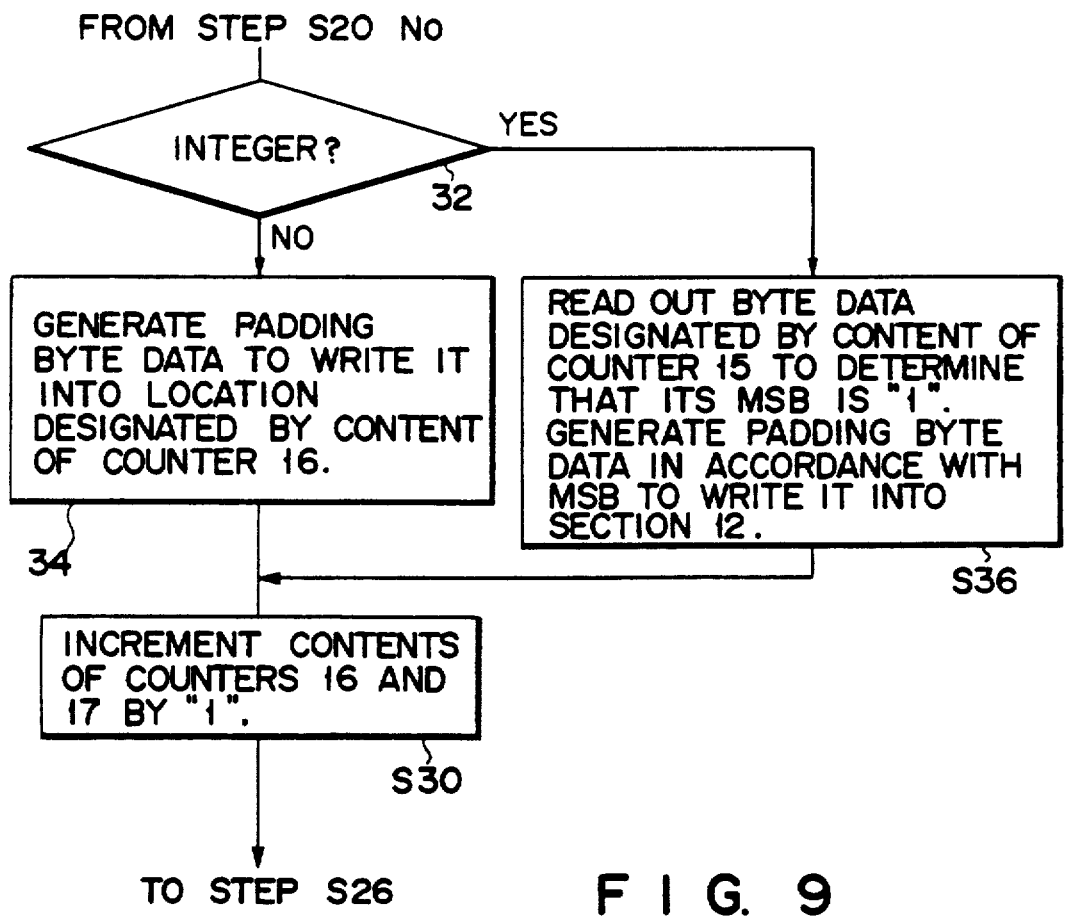
FIG. 9
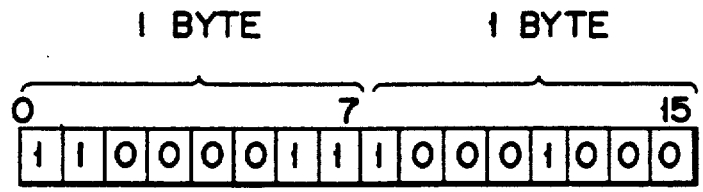
FIG. 10
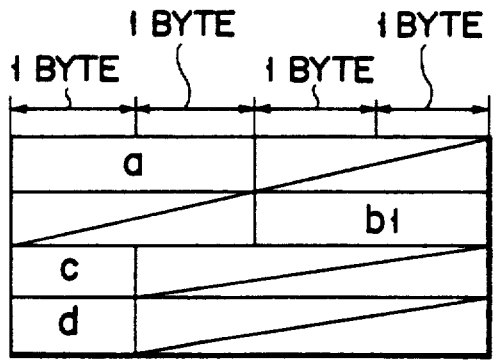 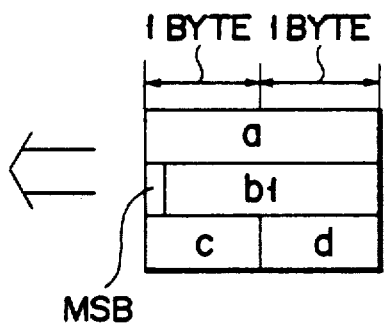
FIG. 11A    FIG. 11B

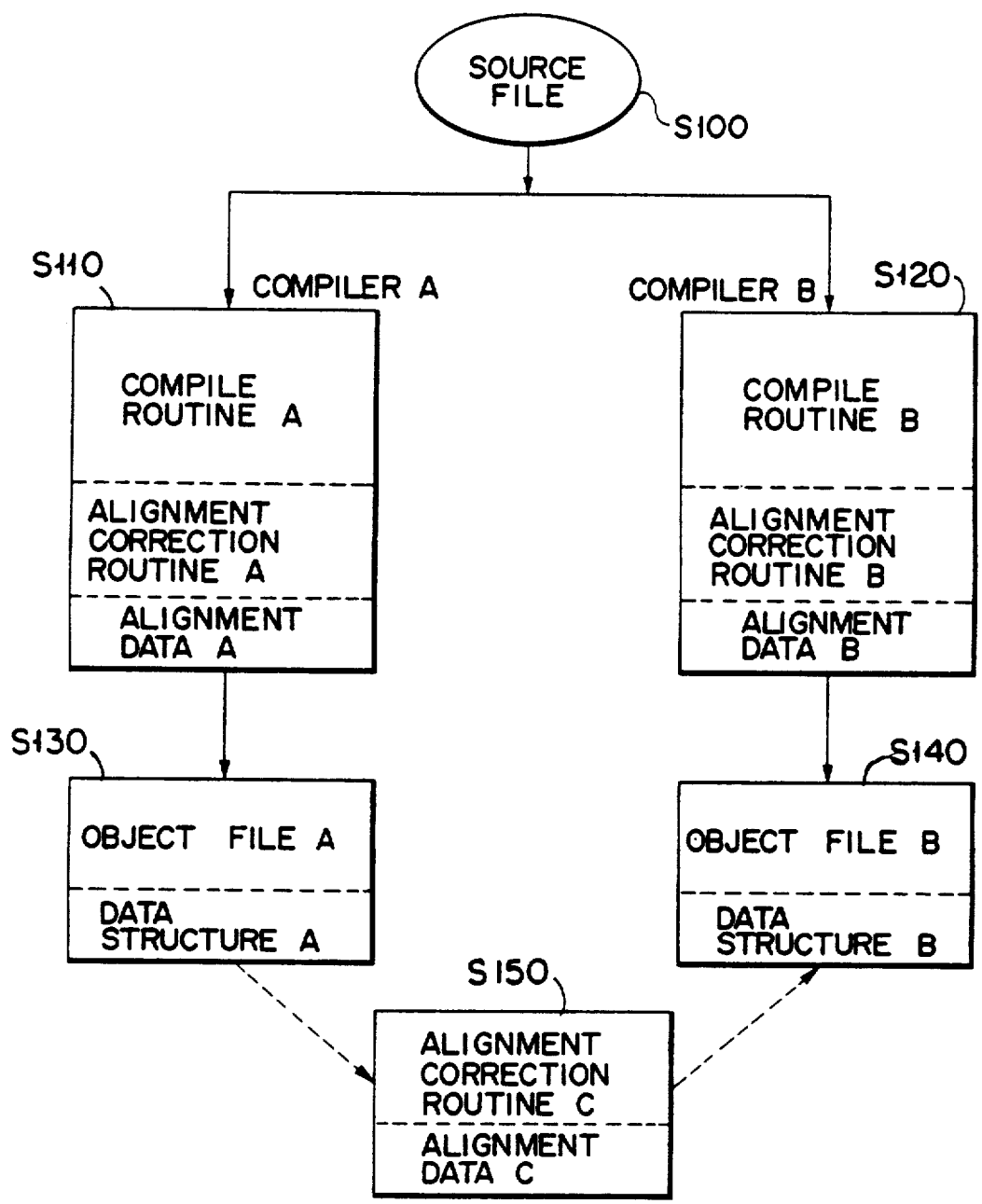
F I G. 12

DATA ALIGNMENT CORRECTION APPARATUS FOR PROPERLY FORMATTING DATA STRUCTURES FOR DIFFERENT COMPUTER ARCHITECTURES

BACKGROUND OF THE INVENTION

The present invention relates to a data alignment correction apparatus for performing alignment correction of a data structure in order that it is properly formatted for a different computer architecture.

In general, when a data structure such as the structure of C language shown in FIG. 1 is processed by a compiler, a head of a word must be aligned to a halfword or fullword boundary. The resultant structure differs depending on the computer and compiler used. This is because computer architectures relating to memory access differ from one model to another. For this reason, when a C language file is planted from one computer to another, the file cannot be directly used if the architectures of the two computers are different. This problem is posed when, for example, a word in the file is written in a specific structure or a header of a communication protocol is output in a specific structure. Therefore, the file cannot be commonly used, and communication cannot be performed even though the same programming language is used, a user cannot use the file.

Therefore data alignment of the data structures must be performed. Conventionally, alignment correction of a structure has been performed by software processing using a special subroutine. However, in order to perform alignment correction by software, a separate subroutine must be formed for each structure, and it takes a very long time to create the software.

SUMMARY OF THE INVENTION

The present invention has been developed in consideration of the above situation and has as its object to provide a data alignment correction apparatus which can perform alignment correction of a data structure at a high speed by a common processing routine. The apparatus comprises: first storage means for storing a source data structure, second storage means for sequentially storing an object data structure, alignment data storage means for storing alignment data corresponding to the source data structure, the alignment data including a plurality of alignment data blocks each corresponding to one of said source data blocks, and central processor means for selectively reading out said source data blocks from said first storage means, said selection being in accordance with the corresponding alignment data blocks from said alignment data storage means, and for outputting the selected source data blocks to said second storage means for storage as object data blocks in said object data structure. The central processor sequentially reads out the alignment data blocks from the alignment data storage section in response to an alignment correction instruction. When the alignment data block is a predetermined value, the source data block is read out from the first storage section and stored to the second storage section. When the alignment data block does not match a predetermined value, the next alignment data blocks is read out from the alignment data storage section without storing the source data element. In this manner, the source data blocks are transferred in accordance with the alignment data blocks, thereby performing alignment correction of the structure.

As described above, according to the present invention, when a program created in one computer is to be run in another (i.e. different) model, alignment correction for a required structure can be performed at a high speed by a common processing subroutine by merely preparing alignment data, regardless of the type of the structure.

BRIEF DESCRIPTION OF THE DRAWINGS

FIG. 9 is a flow chart for explaining an operation of alignment correction of a structure having a 1-byte boundary in a 16-bit machine into a structure having a 4-byte boundary in a 32-bit machine;

FIG. 10 is a view of the alignment data used in the operation of FIG. 9;

FIGS. 11A and 11B are views of the structures having a 4- and 1-byte boundaries to which the alignment data in FIG. 10 is applied; and FIG. 12 is a view for explaining a routine of obtaining an object data structure by alignment processing.

DETAILED DESCRIPTION OF THE PREFERRED EMBODIMENT

An embodiment of the alignment correction apparatus according to the present invention will now be described below, with reference to the accompanying drawings.

Figures 1, 2:
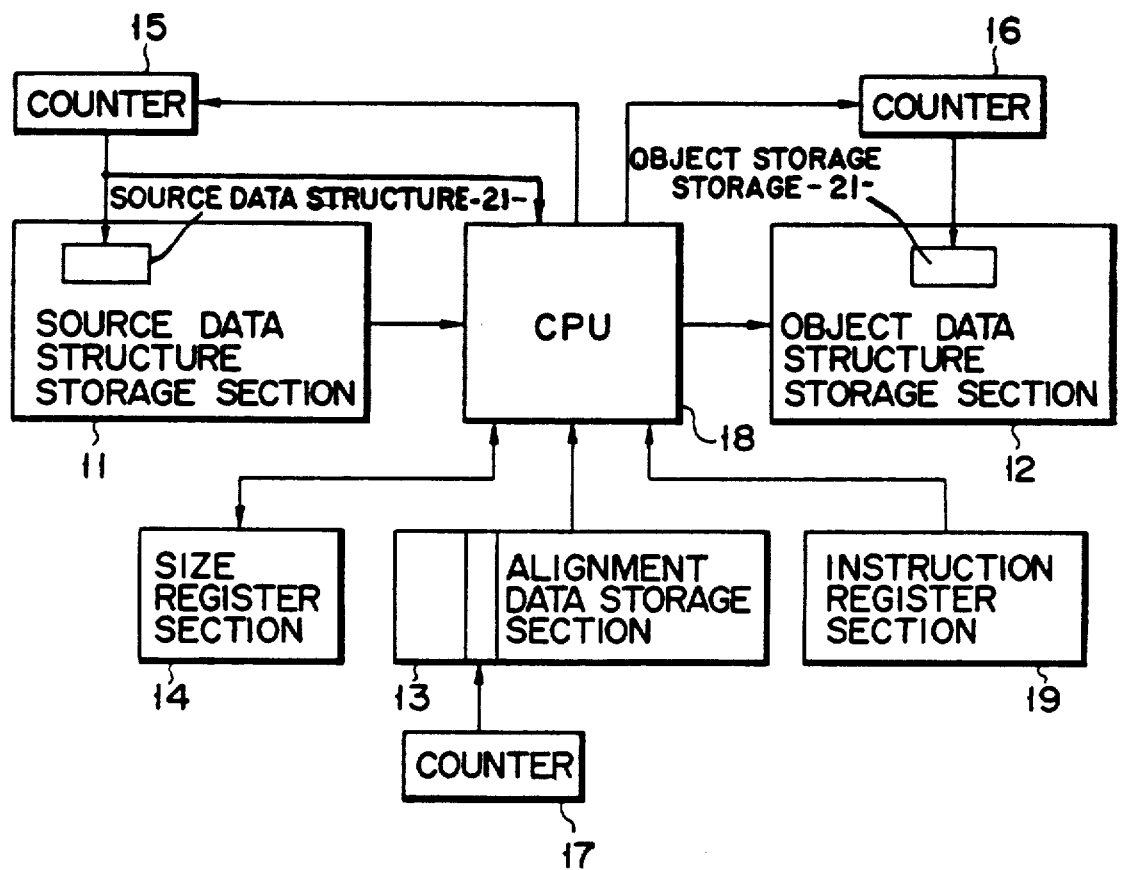
FIG. 1 shows a conventional C language data structure.
FIG. 2 is a block diagram of an arrangement of an alignment correction apparatus according to an embodiment of the present invention.

First, referring to FIG. 2, the arrangement of an embodiment of the alignment correction apparatus according to the present invention will be described in detail. In FIG. 2, source data structure storage section 11 stores at least one source data structure 20. Object data structure storage section 12 stores an object data structure 21 which is obtained by correcting the alignment of the source data structure stored in section 11. Alignment data storage section 13 stores alignment data which corresponds to the alignment relationship between the source and object data structures. The number of alignment data stored in section 13 depends on the number of types and the source data structures.

Figures 5A, 5B:
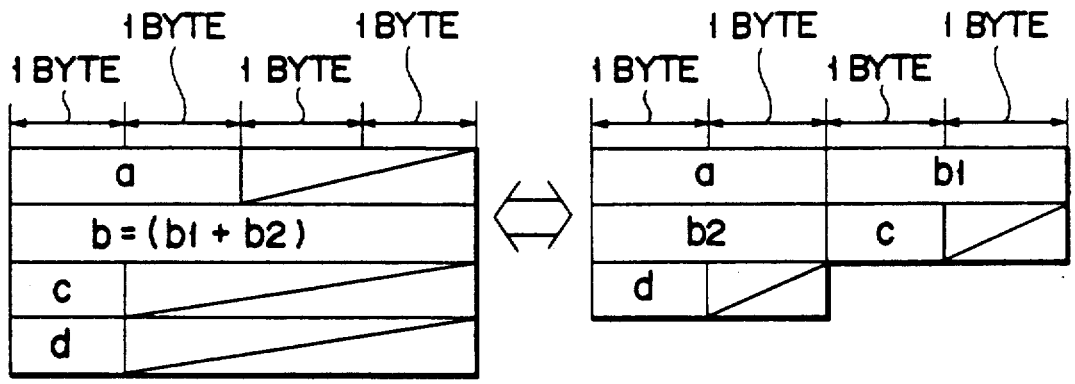
FIGS. 5A and 5B are views having the structures of 4- and 2-byte boundaries, respectively, to which the alignment data in FIG. 4 is applied.

The alignment data includes bit groups. Each bit group (alignment data block) determines whether a data byte (data block) of the source data structure is to be retained or deleted during the alignment correction procedure. A data byte to be deleted is padding data which is inserted for alignment correction. Each data byte of the source data structure is in 1:1 correspondence with each data bit of the alignment data. Therefore, when the size of the source data structure is 16 bytes, as is shown in FIG. 5A, the alignment data includes 16 bits. In this embodiment, each logic "1" bit of the alignment data represents that the corresponding data byte is to remain after correction, and each logic "0" represents that the data is to be deleted thereafter.

Returning to FIG. 2, the data alignment correction apparatus also includes size register section 14 for storing the byte size value of a source data structure, counter 15 for indicating the location of a byte to be accessed in source data structure, and instruction register section 19 for holding an instruction of an alignment correction routine. The alignment correction apparatus further includes counter 16 for indicating the location of a byte to be stored in storage section 12, counter 17 for indicating the location of a bit to be accessed in alignment data storage section 13, and CPU 18 for executing a variety of alignment correction instructions. Note that in this embodiment, source data structure, object data structure, and alignment data storage sections 11, 12, and 13, registers 14 and 19, and counters 15 and 17 are allocated in a main memory.

An alignment correction operation performed by the first embodiment will now be described below, with reference to the flow charts of FIGS. 3A and 3B. Assume that source data structure storage section 11 stores, as a source data structure, the structure shown in FIG. 5A, that size register section 14 stores the byte size value of the structure, i.e., "15", and that alignment data storage section 13 stores the alignment data shown in FIG. 4.

CPU 18 fetches an alignment correction instruction from instruction register section 19 and decodes it. As a result, in step S2, counters 15 to 17 are initialized to, for example, "0". By the alignment correction instruction, a source data structure and alignment data are designated, and a head location of object data structure storage section 12 storing for an object data structure is designated. In this embodiment, the alignment correction instruction is either a delete alignment correction instruction or an insertion alignment correction instruction. If the instruction is a delete alignment correction instruction, step S6 is sequentially executed subsequent to step S4. If the instruction is an insertion alignment correction instruction, step S18 is sequentially executed after step S4.

Figure 4:
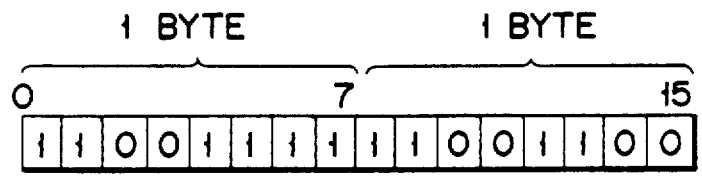
FIG. 4 is a view of alignment data used to perform alignment correction of a structure having a 4-byte boundary into a structure having a 2-byte boundary.

If the fetched instruction is a delete alignment instruction, bit 0 of the alignment data in storage section 13, designated by the content of counter 17 is read out in step S6. In step S8, CPU 18 checks whether the readout bit 0 data is logic "1". If Y (YES) in step S8, step S10 is executed. If N (NO) in step S8, step S16 is executed. In this case, since the alignment data is given as shown in FIG. 4, the bit 0 data is logic "1". Therefore, steps S8 and S10 are sequentially executed.

In step S10, byte data of the source data structure in storage section 11, designated as by the content of counter 159, is read out. The byte data is written in a location of storage section 12 as designated by the content of counter 16. As a result, the byte data read out from storage section 11 remains after correction. When step S10 is completed, the contents of counters 15, 16, and 17 are all incremented by "1" in step S12 and advance to the location of the next byte to be read out from source data storage section 11, the location of the next byte to be written to object data storage section 12, and the location of the next bit to be read out from alignment data storage section 17, respectively.

On the other hand, if the bit data of the alignment data is logic "0", as is bit 3 data, only counters 15 and 17 are incremented by "1", in step S16. As a result, the byte data, of the source data structure in storage section 11, as designated by the content of counter 15 is deleted after correction.

When step S12 or S16 is executed, the content of counter 15 and that of register section 14, i.e., the size value of the source data structure, are fetched 11 and CPU 18 checks whether the content of counter 15 exceeds the size value set in register section 14, in step S14. If N (NO) in step S14, CPU 18 determines that the alignment correction processing with respect to all the byte data of the source data structure is not completed, and the flow returns to step S6.

By repeatedly performing the alignment correction processing, the structure shown in FIG. 5B is generated from its start byte, in units of bytes, in storage section 12. When the count of counter 15 exceeds the size value set in register section 14, CPU 18 completes the alignment correction processing. In this manner, the delete alignment correction instruction is executed.

Figure 6:
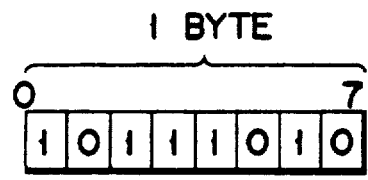
FIG. 6 is a view of a modification of the alignment data in FIG. 4.

In the above description, one data byte of the source data structure corresponds to one data bit of the alignment data. However, when a structure having a 4-byte boundary is to be aligned to a structure having a 2-byte boundary, the alignment data can be reduced by causing 2-byte data of the source data structure to correspond to 1-bit data of the alignment data, as shown in FIG. 6. In this case, two bytes of source data is one source data block, and counters 15 and 16 are incremented by "2" in step S12 or S16.

The case wherein object file B including structure B is obtained from a source file will now be described below.

In this case, as is shown in FIG. 12, object file B can be obtained at S140 by compiling the source file by compiler B at S120 including alignment correction routine B as described above. When object file A compiled by compiler A at S110 including alignment correction routine A as described above is present at S130, object file C can be obtained at S150 by performing alignment correction processing by alignment correction routine C substantially the same as alignment correction routine B S120.

Figure 7:
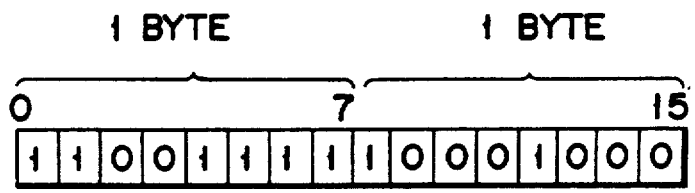
FIG. 7 is a view of alignment data used to perform alignment correction of a structure of 4-byte boundary in a 32-bit machine into a structure of 1-byte boundary in a 16-bit machine.
Figures 8A, 8B:
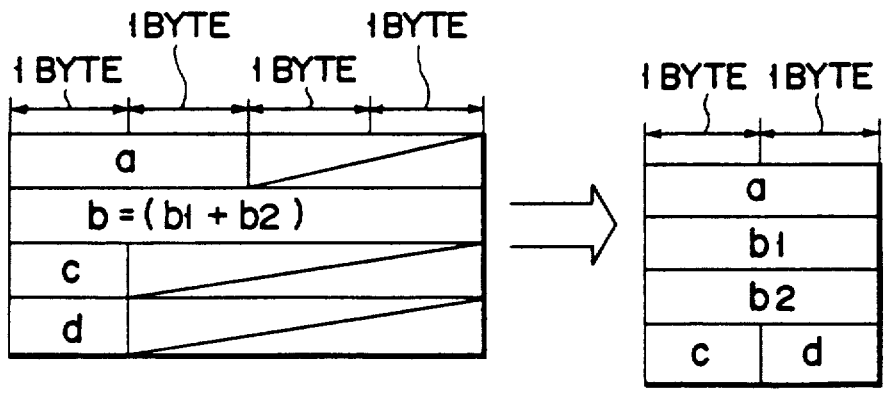
FIGS. 8A and 8B are views of the structures of 4- and 1-byte boundaries, respectively, to which the alignment data in FIG. 7 is applied.

FIGS. 7 and 8A and 8B show alignment correction of a structure having a 4-byte boundary in a 32-bit machine into a structure having a 1-byte boundary in a 16-bit machine. An alignment correction processing routine is similar to that in steps S2 to S16 described above.

Alignment correction of a structure of 2-byte boundary shown in FIG. 5B into a structure of 4-byte boundary shown in FIG. 5A by insertion alignment correction will be described with reference to the flow charts of FIGS. 3A and 3B. In this case, the structure shown in FIG. 5B is stored in storage section 11, and a size value and alignment data corresponding to the structure are stored in register section 14 and storage section 13, respectively.

First, an alignment correction instruction is decoded. Then, if CPU 18 determines in step S4 that the instruction is the insertion alignment correction instruction, step S18 is executed. In this case, the alignment data is given as shown in FIG. 4, i.e., the same as that used in the case of the delete alignment correction instruction but may be different therefrom.

In step S18, bit data of the alignment data in storage section 13 designated by the content of counter 17 is read out. Then, in step S20, CPU 18 checks whether the readout bit data is logic "1". If Y (YES) in step S20, step S22 is executed. If N (NO) in step S20, step S28 is executed. In step S22, byte data of a source data structure in storage section 11 designated by the content of counter 15 is read out. The readout byte data is written in a location in storage section 12 designated by the content of counter 16. As a result, the byte data read out from storage section 11 remains after correction. When step S22 is completed, the contents of counters 15, 16, and 17 are all incremented by "1" in step S24 and advance to a position of the next byte to be read out, a position of the next byte to be written, and a position of the next bit to be read out, respectively.

On the contrary, if the readout bit data is logic "0", CPU 18 generates padding data. The generated padding data is stored in a location designated by the content of counter 16 of storage section 12. Thereafter, the contents of counters 16 and 17 are incremented by "1" in step S30.

When step S24 or S30 is executed, the content of counter 15 and the content of register section 14, i.e., the size value of the source data structure are read out, and CPU 18 checks whether the content of counter 15 exceeds the size value set in register section 14, in step S26. If N in step S26, CPU 18 determines that the alignment correction processing with respect to all the byte data of the source data structure in storage section 11 is not completed, and the flow returns to step S18.

As described above, by repeatedly performing the alignment correction processing, the structure shown in FIG. 5A is generated from its start byte in units of bytes in storage section 12. When the count of counter 15 exceeds the size value set in register section 14, CPU 18 completes the alignment processing. In this manner, the insertion alignment processing is executed.

The present invention can also be used to absorb a difference between the numbers of bits of "int" in 32- and 16-bit computers. Note that in order to extend a negative number from 2 bytes to 4 bytes, padding data of FFFFH and not 0000H must be used, etc. An operation in this case will be described with reference to FIGS. 9, 10, and 11A and 11B. First, a structure, alignment data, and a size value are designated by an insertion alignment correction instruction. A structure to be designated is shown in FIG. 11B and is stored in storage section 11. Alignment data to be designated is shown in FIG. 10 and is stored in storage section 13.

Figure 3A:
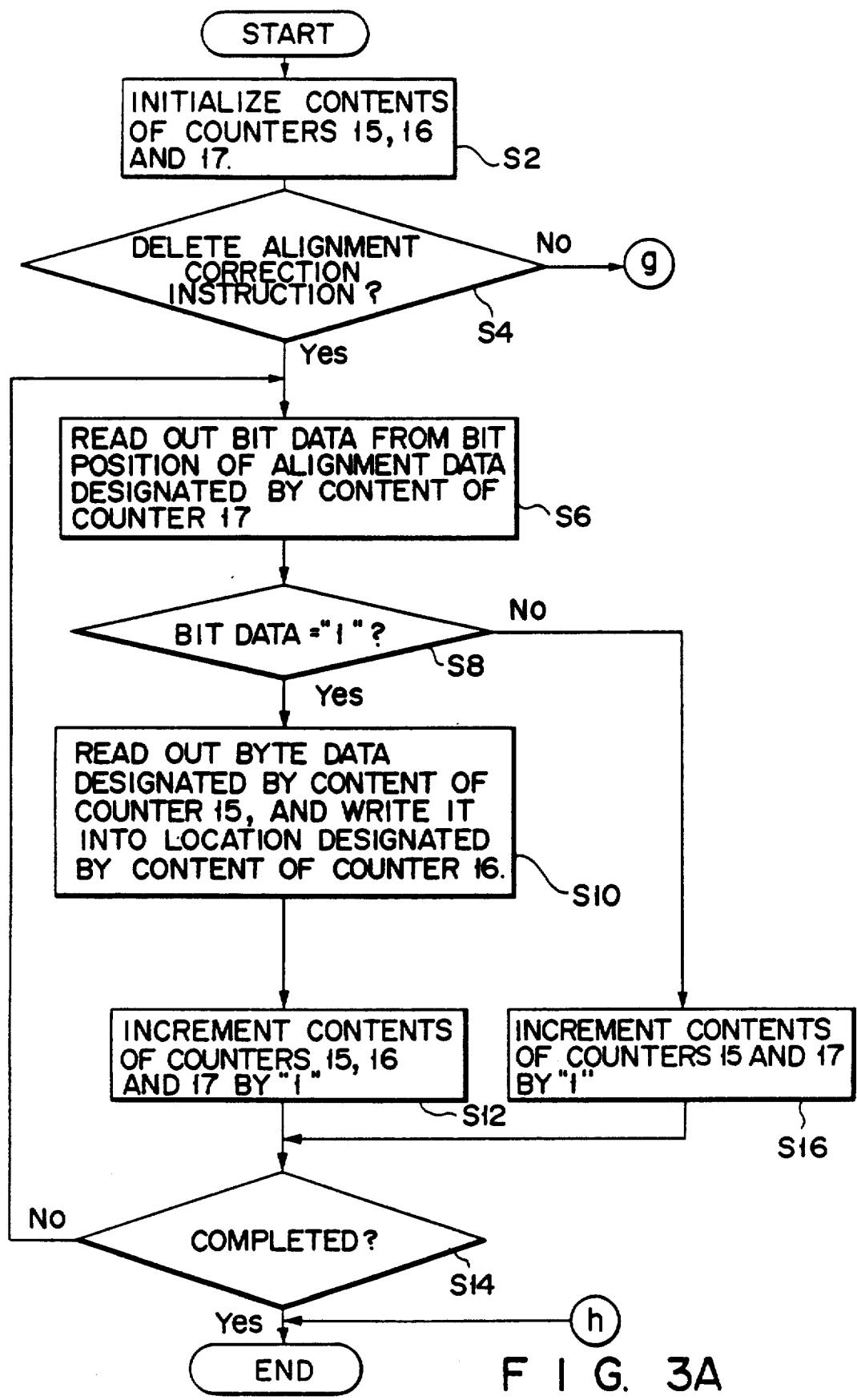
FIGS. 3A and 3B are flow charts for explaining an operation of the first embodiment in FIG. 1.
Figure 3B:
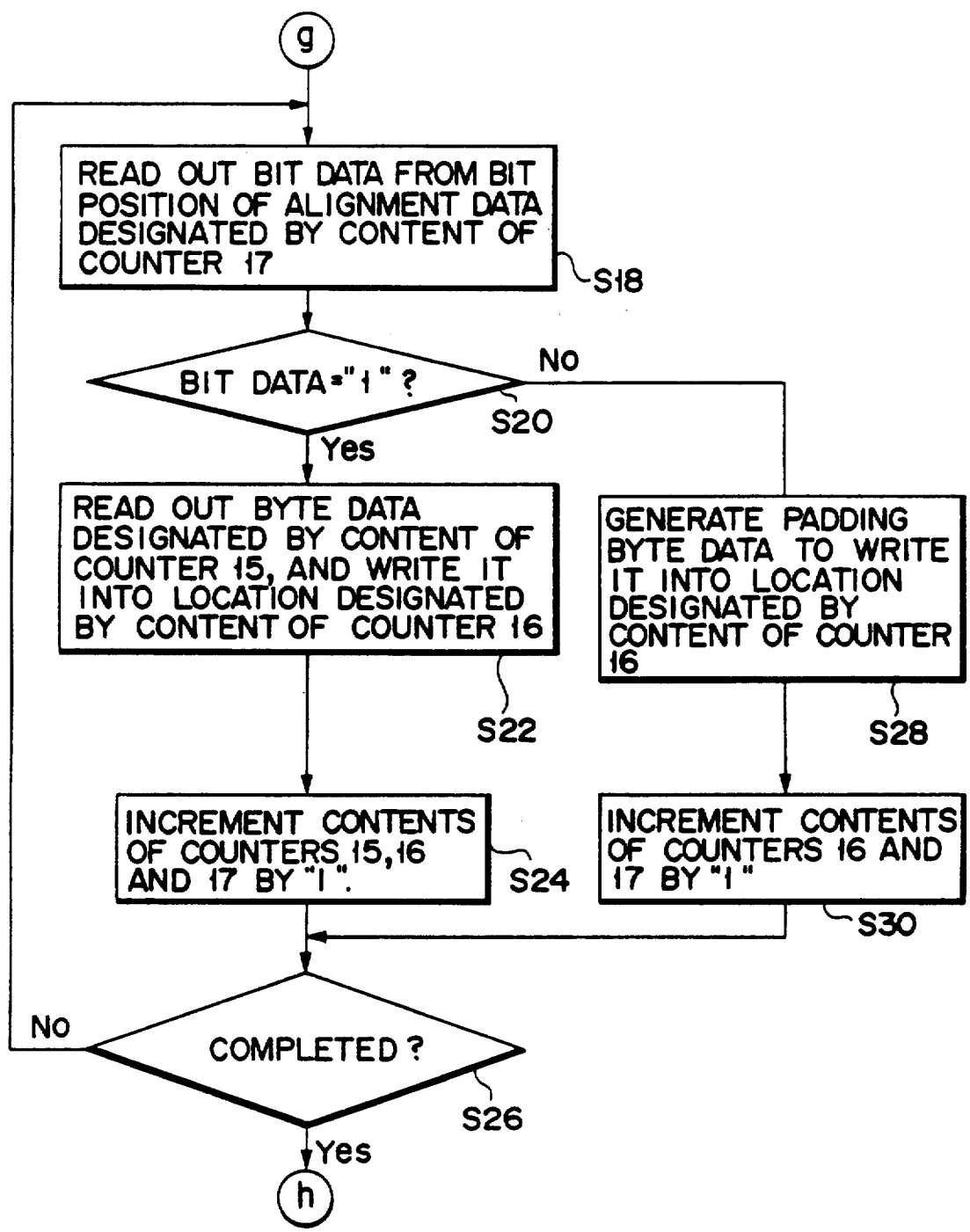

The basic operation is substantially the same as that used in the case of the insertion alignment correction instruction shown in FIGS. 3A and 3B except that steps S32 to S36 are executed instead of step S28.

If CPU 18 determines in step S20 that bit data is logic "0", step S32 is executed. In step S32, CPU 18 checks whether byte data designated by the content of counter 15 is start byte data in an integer area. Since a byte position where the integer area begins is indicated in the insertion alignment correction instruction, CPU 18 checks the content of counter 15 to determine whether the integer area is designated. If N (NO) in step S32, the flow advances to step S34, and the same processing as that in step S28 is executed.

If Y in step S32, byte data designated by the content of counter 15 is read out from storage section 11, and CPU 18 checks whether its MSB is logic "1" or "0". If the MSB is "0", padding byte data of "00"H is generated as described above. If the MSB is logic "1", padding byte data of "FF"H is generated. The generated padding data is stored in a location designated by the content of counter 16 of storage section 12. After step S34 or S36 is executed, processing similar to that in the case of the insertion alignment correction instruction shown in FIG. 3B is executed.

In the above embodiment, counters 15 to 17 are sequentially incremented. However, the content of counter 17 may be set in accordance with subinstructions of the alignment correction instruction. Each subinstruction includes information for designating a location of storage section 12 for byte data of the source structure which is to be stored. In this case, descriptions with respect to counter 17 can be omitted in steps S2, S16, S12, S24, and S30 can be also omitted, and the content of counter 17 may be set in accordance with the subinstructions in steps S6 and S20.

What is claimed is:

1. A data alignment apparatus for aligning a source data structure for use in a different computer architecture, comprising:
   first storage means for storing a source data structure, the source data structure including a plurality of source data blocks;
   second storage means for sequentially storing an object data structure, the object data structure including a plurality of object data blocks each corresponding to at least one of said source data blocks;
   alignment data storage means for storing alignment data corresponding to the source data structure, the alignment data including a plurality of alignment data blocks each corresponding to one of said source data blocks; and
   central process or means, connected to said first storage means, said second storage means and said alignment data storage means, for selectively reading out said source data blocks from said first storage means, said selection being made in accordance with the corresponding alignment data blocks from said alignment data storage means, and for outputting the selected source data blocks to said second storage means for storage as object data blocks in said object data structure.

2. The apparatus according to claim 1, wherein said first storage means includes a first pointer for designating one of said source data blocks to be read out, said second storage means includes a second pointer for designating a memory location in which the selected source data blocks are to be stored as object data blocks, and said central process or means further performs the functions of:
   (a) sequentially reading out the alignment data blocks from said alignment data storage means, in response to an alignment correction instruction;
   (b) determining whether each of the alignment data blocks read in said sequential reading function (a) is a predetermined value;
   (c) reading out from said first storage means the source data block designated by said first pointer when said determining function (b) determines that the alignment data block is the predetermined value, and storing the source data block read in said reading out function (c) in the memory location of said second storage means designated by said second pointer.

3. The apparatus according to claim 2, further comprising:
size data storage means, connected to said central processor means, for storing size data representing a number of source data blocks in the source data structure, wherein
said central process or means reads out the size data from said size data storage means, and stops the reading out of alignment data blocks from said alignment data storage means when a value of said first pointer exceeds the size data.

4. A data alignment apparatus for aligning a source data structure for use in a different computer architecture, comprising:
first storage means for storing a source data structure, the source data structure including a plurality of source data blocks;
second storage means for sequentially storing an object data structure, the object data structure including a plurality of object data blocks each corresponding to at least one of said source data blocks;
alignment data storage means for storing alignment data corresponding to the source data structure, the alignment data including a plurality of alignment data blocks each corresponding to one of said source data blocks; and
central process or means, connected to said first storage means, said second storage means and said alignment data storage means, for sequentially reading out the alignment data blocks from said alignment data storage means, and for selectively reading out said source data blocks from said first storage means in accordance with the corresponding alignment data blocks from said alignment data storage means, and for outputting the selected source data blocks to said second storage means for storage as object data blocks in said object data structure, said central processor means selectively inserting padding data in said object data structure in accordance with the alignment data blocks.

5. The apparatus according to claim 4, wherein said first storage means includes a first pointer for sequentially designating one of said source data blocks to be read out, said second storage means includes a second pointer for sequentially designating a memory location in said second storage means in which the selected source data blocks are to be stored as object data blocks, and said central process or means further performs the functions of:
(a) sequentially reading out the alignment data blocks from said alignment data storage means in response to an insertion alignment correction instruction;
(b) determining whether each of the alignment data blocks read out in said reading function (a) is a predetermined value;
(c) reading out the source data block designated by said first pointer when said determining function (b) determines that the readout alignment data block is a predetermined value, and storing the source data block as an object data block in said second storage means at a memory location designated by said second pointer; and
(e) generating padding data when it is determined by said determining function (b) that the alignment data block read out in said reading function (a) is not the predetermined value, and for storing the generated padding data as an object data block in said second storage means at a memory location designated by said second pointer.

6. The apparatus according to claim 5, further comprising:
size data storage means, connected to said central processor means, for storing size data representing a number of the source data blocks in the source data structure, and wherein
said central process or means reads out the size data from said size data storage means, and stops the reading out of alignment data blocks from said alignment data storage means when a value of said first pointer exceeds the size data.

7. The apparatus according to claim 5, wherein said central processor means further performs the functions of:
(f) determining whether an input alignment correction instruction is a delete alignment correction instruction or the insertion alignment correction instruction; and
(g) sequentially reading out the alignment data blocks from said alignment data storage means when said determining function (f) determines that the input alignment correction instruction is the delete alignment correction instruction, sequentially reading out the source data blocks from said first storage means in accordance with the alignment data blocks read from said alignment data storage means, and outputting the source data blocks read from said first storage means to said second storage means for storage as object data blocks.

8. The apparatus according to claim 7, wherein said reading out function (g) of said central processor means further performs the functions of:
(h) sequentially reading out the alignment data blocks from said alignment data storage means, in response to the delete alignment correction instruction;
(i) determining whether an alignment data block is a second predetermined value; and
(j) reading the source data block designated by said first pointer from said first storage means when it is determined that the alignment data block is the second predetermined value, and storing the source data block read from said first storage means as an object data block in said second storage means at a memory location designated by said second pointer.

9. The apparatus according to claim 7, further comprising:
size data storage means, connected to said central processing means, for storing size data representing a number of source data blocks in the source data structure, wherein
said central processor means reads out the size data from said size data storage means, and stops reading of the alignment data blocks when a value of said first pointer exceeds the size data.

10. The apparatus according to claim 5, wherein said generating function (e) further performs the function of:
generating said padding data in accordance with the insertion alignment correction instruction.

11. A data alignment apparatus for aligning a source data structure for use in a different computer architecture, comprising:
first storage means for storing a source data structure, the source data structure including a plurality of source data blocks;

second storage means for sequentially storing an object data structure, the object data structure including a plurality of object data blocks each corresponding to at least one of said source data blocks;

alignment data storage means for storing alignment data corresponding to the source data structure, the alignment data including a plurality of alignment data blocks each corresponding to one of said source data blocks; and central processor means, connected to said first storage means, said second storage means and said alignment data storage means, and responsive to an input alignment correction instruction, for reading out the alignment data blocks from said alignment data storage means, and for selectively reading out the source data blocks from said first storage means in accordance with the alignment data blocks, and for selectively generating padding data in accordance with the readout alignment data blocks, and for outputting the selected source data blocks and padding data to said second storage means for storage as object data blocks in said object data structure.

12. The apparatus according to claim 11, wherein said first storage means includes a first pointer for holding data designating the source data block to be read out, and said second storage means includes a second pointer for holding data designating a memory location in said second storage means in which the selected source data block is to be stored as an object data block, said central process or means further performing the functions of:

(a) sequentially reading out the alignment data blocks from said alignment data storage means in response to the input alignment correction instruction;

(b) determining whether the readout alignment data block is a predetermined value;

(c) determining whether an input alignment correction instruction is a delete alignment correction instruction or an insertion alignment correction instruction;

(d) selectively setting said second pointer in accordance with the input alignment correction instruction;

(e) reading the source data block designated by said first pointer when said determining function (c) determines that the input alignment correction instruction is the insertion alignment correction instruction and said determining function (b) determines that the readout alignment data block is the predetermined value, said reading function (e) also storing the selected source data blocks as object data blocks in a memory location of said second storage means designated by said second pointer;

(f) generating the padding data when said determining function (c) determines that the input alignment correction instruction is the insertion alignment correction instruction and said determining function (b) determines that the alignment data block is not the predetermined value, and storing the generated padding data as an object data block in a memory location of the second storage means designated by the second pointer; and (g) reading out the source data block designated by the first pointer from said first storage means when said determining function (e) determines that the input alignment correction instruction is the delete alignment correction instruction and said determining function (b) determines that the readout alignment data block is the predetermined value, and storing the selected source data blocks as object data blocks in a memory location of said second storage means designated by said second pointer.

* * * * *